(12) United States Patent
Pillans et al.

(10) Patent No.: US 9,373,460 B2
(45) Date of Patent: Jun. 21, 2016

(54) METHOD FOR MANUFACTURING A HIGH-CAPACITANCE RF MEMS SWITCH

(71) Applicant: Raytheon Company, Waltham, MA (US)

(72) Inventors: Brandon W. Pillans, Plano, TX (US); Francis J. Morris, Dallas, TX (US); Mikel J. White, Murphy, TX (US)

(73) Assignee: RAYTHEON COMPANY, Waltham, MA (US)

( * ) Notice: Subject to any disclaimer, the term of this patent is extended or adjusted under 35 U.S.C. 154(b) by 698 days.

(21) Appl. No.: 13/727,524

(22) Filed: Dec. 26, 2012

(65) Prior Publication Data

US 2013/0111738 A1 May 9, 2013

Related U.S. Application Data

(62) Division of application No. 12/765,512, filed on Apr. 22, 2010, now Pat. No. 8,368,491.

(51) Int. Cl.
| | |
|---|---|
| *H01H 11/00* | (2006.01) |
| *H01H 65/00* | (2006.01) |
| *H01H 57/00* | (2006.01) |
| *H01G 5/16* | (2006.01) |

(52) U.S. Cl.
CPC .............. *H01H 11/00* (2013.01); *H01G 5/16* (2013.01); *H01H 57/00* (2013.01); *Y10T 29/49105* (2015.01)

(58) Field of Classification Search
CPC ......... H01H 57/00; H01H 11/00; H01G 5/16; Y10T 29/49105; Y10T 29/49126; Y10T 29/49155
USPC .............. 29/622, 830, 846; 257/415, 419; 438/50–53; 400/479.2; 200/181, 600
See application file for complete search history.

(56) References Cited

U.S. PATENT DOCUMENTS

| | | | |
|---|---|---|---|
| 4,564,832 A * | 1/1986 | Inoue | 400/479.2 |
| 6,452,124 B1 | 9/2002 | York et al. | |
| 6,791,441 B2 | 9/2004 | Pillans et al. | |
| 7,102,472 B1 | 9/2006 | Nathanson et al. | |
| 7,474,171 B2 | 1/2009 | Morris | |
| 7,977,757 B2 * | 7/2011 | Yoshikawa et al. | 438/53 |
| 2003/0146079 A1 | 8/2003 | Goldsmith | |
| 2005/0012577 A1 | 1/2005 | Pillans et al. | |
| 2007/0278075 A1 | 12/2007 | Terano et al. | |
| 2010/0163376 A1 | 7/2010 | Yoon et al. | |

* cited by examiner

*Primary Examiner* — Donghai D Nguyen
(74) *Attorney, Agent, or Firm* — Lewis Roca Rothgerber Christie LLP

(57) ABSTRACT

Systems and methods for providing high-capacitive RF MEMS switches are provided. In one embodiment, the invention relates to a micro-electro-mechanical switch assembly including a substrate, an electrode disposed on a portion of the substrate, a dielectric layer disposed on at least a portion of the electrode, a metal layer disposed on at least a portion of the dielectric layer, and a flexible membrane having first and second ends supported at spaced locations on the substrate base, where the flexible membrane is configured to move from a default position to an actuated position in response to a preselected switching voltage applied between the flexible membrane and the electrode, and where, in the actuated position, the flexible membrane is in electrical contact with the metal layer.

10 Claims, 4 Drawing Sheets

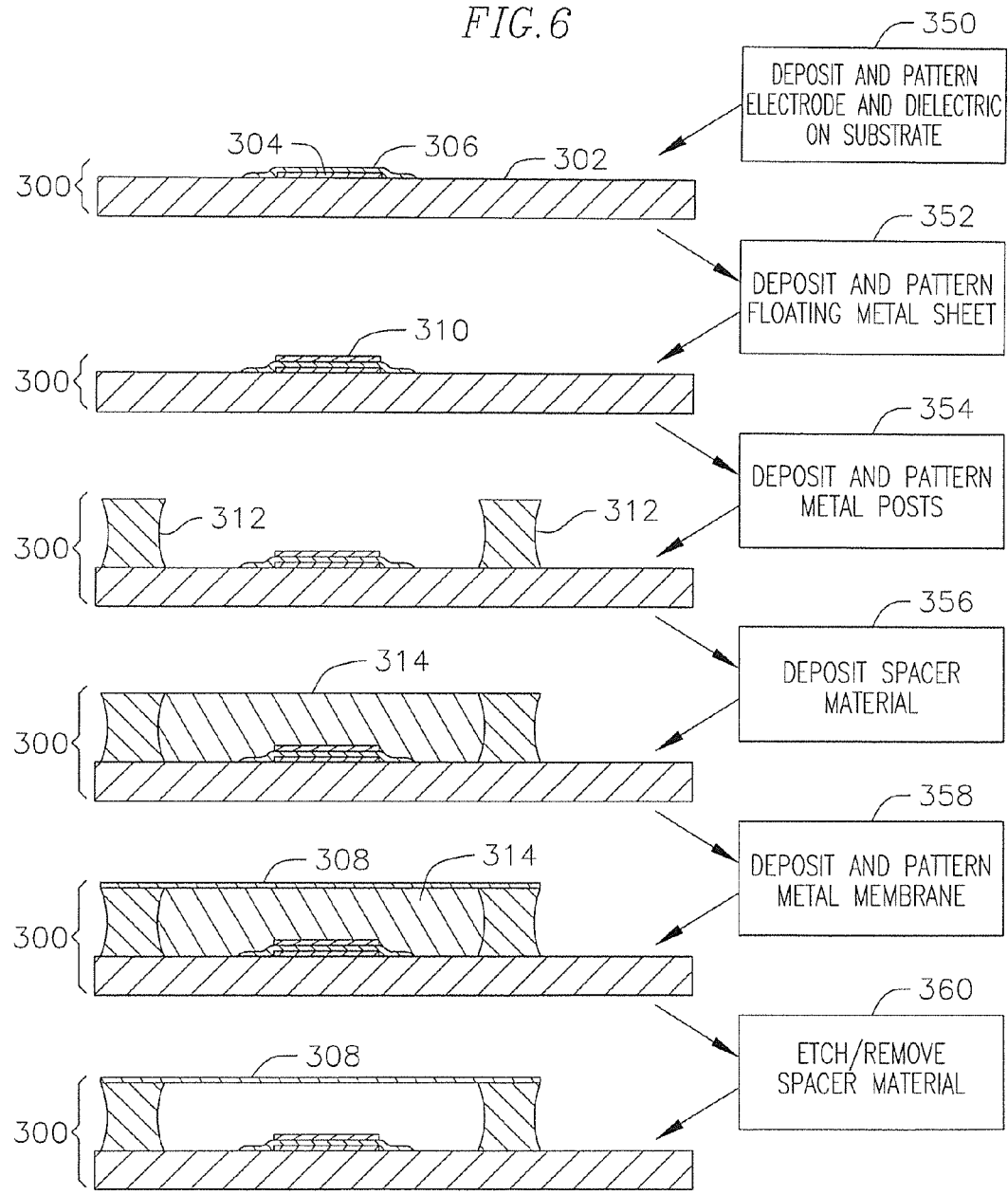

METHOD FOR MANUFACTURING A HIGH-CAPACITANCE RF MEMS SWITCH

CROSS-REFERENCE TO RELATED APPLICATION(S)

This application is a divisional of U.S. patent application Ser. No. 12/765,512, entitled SYSTEMS AND METHODS FOR PROVIDING HIGH CAPACITANCE RF MEMS SWITCHES, filed Apr. 22, 2010, now U.S. Pat. No. 8,368,491, the entire contents of which are incorporated herein by reference.

FIELD OF THE INVENTION

This invention relates in general to switches and, more particularly, to systems and methods for providing high-capacitive RF MEMS switches.

BACKGROUND

One existing type of switch is a radio frequency (RF) micro-electro-mechanical system (MEMS) switch. This existing type of switch typically has a substrate with two conductive posts spaced apart on the substrate. A conductive part (e.g., electrode) is provided on the substrate between the posts, and is covered by a layer of a dielectric material. A flexible and electrically conductive membrane extends between the posts, so that a central portion of the membrane is located above the conductive part on the substrate. An RF signal is applied to one of the conductive part and the membrane.

In the deactuated or non-actuated state of the switch, the membrane is spaced above both the conductive part and the dielectric layer covering it. In order to actuate the switch, a direct current (DC) bias voltage is applied between the membrane and the conductive part. This bias voltage produces charges on the membrane and the conductive part, and the charges cause the membrane and conductive part to be electrostatically attracted to each other. This attraction causes the membrane to flex, so that a central portion thereof moves downwardly until it contacts the top of the dielectric layer on the conductive part. This is the actuated position of the membrane.

In this actuated state of the switch, the spacing between the membrane and the conductive part is less than in the deactuated state. Therefore, in the actuated state, the capacitive coupling between the membrane and the conductive part is significantly larger than in the deactuated state. Consequently, in the actuated state, the RF signal traveling through one of the membrane and conductive part is capacitively coupled substantially in its entirety to signals traveling along the other part.

In order to deactuate the switch, the DC bias voltage is turned off. The inherent resilience of the membrane then returns the membrane to its original position, which represents the deactuated state of the switch. Because the capacitive coupling between the membrane and conductive part is much lower in the deactuated state, the RF signal traveling through one of the membrane and capacitive part experiences little or no capacitive coupling to signals traveling along the other part.

In certain applications, the ratio of capacitance in the actuated state to capacitance in the non-actuated or default state can be very important. In general, the greater the capacitance ratio is, the greater the bandwidth is that can be provided by the switch. The non-actuated capacitance, or off-capacitance, is a function of the switch membrane and parasitics when the membrane is in the non-actuated position. The actuated capacitance, or on-capacitance, is a function of the metal-insulator-metal (MIM) capacitor formed when the membrane snaps down to the actuated position on top of the dielectric covering the electrode. To provide a RF MEMS switch with better performance characteristics, it is therefore desirable to increase the on-capacitance of the switch.

SUMMARY OF THE INVENTION

Aspects of the invention relate to systems and methods for providing high-capacitive RF MEMS switches. In one embodiment, the invention relates to a micro-electro-mechanical switch assembly including a substrate, an electrode disposed on a portion of the substrate, a dielectric layer disposed on at least a portion of the electrode, a metal layer disposed on at least a portion of the dielectric layer, and a flexible membrane having first and second ends supported at spaced locations on the substrate base, where the flexible membrane is configured to move from a default position to an actuated position in response to a preselected switching voltage applied between the flexible membrane and the electrode, and where, in the actuated position, the flexible membrane is in electrical contact with the metal layer.

In another embodiment, the invention relates to a method for manufacturing a micro-electro-mechanical switch assembly including depositing an electrode material on a surface of a substrate, depositing a dielectric material on at least a portion of a surface of the electrode material, depositing a metal layer on at least a portion of a surface of the dielectric layer, depositing a plurality of posts on the substrate at positions spaced apart from the electrode material, depositing a spacer material on the metal layer and between the posts, depositing a flexible membrane on the spacer material and the posts, and etching the spacer material from the assembly.

BRIEF DESCRIPTION OF THE DRAWINGS

FIG. 6 is an diagrammatic illustration of a process for manufacturing a RF MEMS switch, including cross sectional views of the switch at various stages and corresponding process steps, in accordance with one embodiment of the invention.

DETAILED DESCRIPTION OF THE INVENTION

Figure 1:
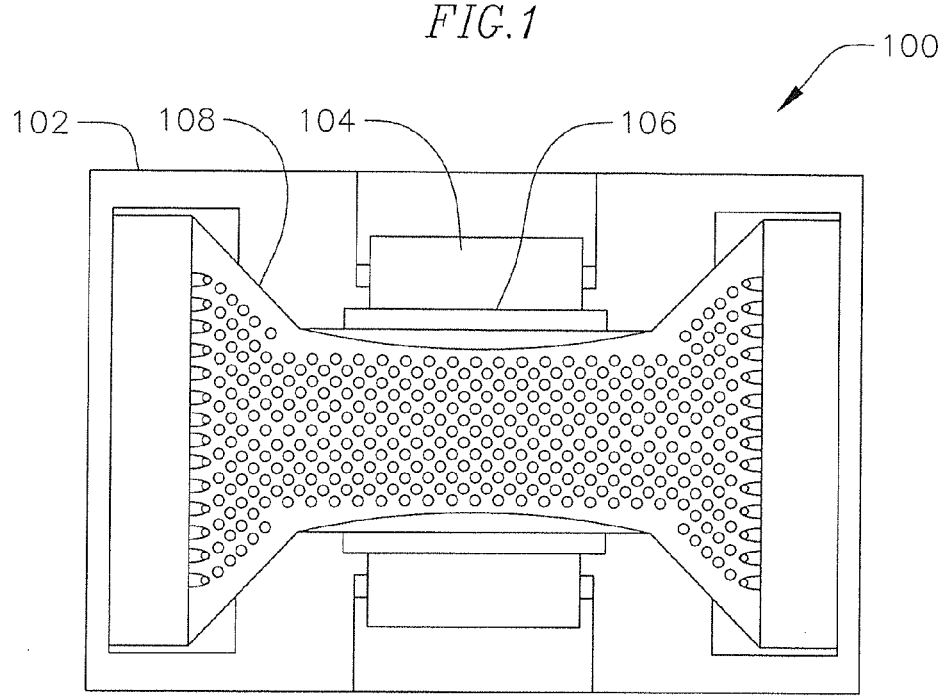
FIG. 1 is a top view of a RF MEMS switch having a floating metal layer for reducing an air-gap in the actuated position of the switch in accordance with one embodiment of the invention.

Capacitance of an RF MEMS switch is a characteristic that is important to performance of the switch. While not bound by any particular theory, capacitance of an RF MEMS switch in the actuated state, or on-capacitance, is a function of the dielectric constant and thickness of the dielectric. More specifically, the on-capacitance is proportional to the dielectric constant for a constant thickness. In RF MEMS capacitive switches, often there is a finite amount of air (e.g., air gaps), caused by surface roughness, between the membrane and dielectric that dramatically reduces the maximum obtainable on-capacitance because the air has a low dielectric constant and because these air gaps are not easily removed. In such case, the reduced on-capacitance undesirably limits the low-frequency broadband operation of the RF MEMS switch.

Referring now to the drawings, embodiments of RF MEMS switches include a substrate, an electrode positioned on the substrate, a dielectric positioned on the electrode, a flexible membrane and a floating (e.g., electrically isolated) metal layer positioned on the dielectric that substantially removes or eliminates the capacitive effects of any air gaps. The floating metal layer can be deposited onto the dielectric layer such that a minimal air gap exists between the floating metal layer and the dielectric. In several embodiments, the floating metal layer is deposited onto the dielectric layer such that no air gap exists between the floating metal layer and the dielectric. When the RF MEMS switches are actuated, the flexible membrane can make an ohmic contact with the floating metal layer. As such, despite any air gaps that might exist between the floating metal layer and the flexible membrane, the floating metal layer effectively becomes continuous with the flexible membrane. In such case, the on-capacitance becomes a function of only the dielectric constant and thickness of the dielectric material. Thus, the on-capacitance can be increased without limits caused by air gaps.

In a number of embodiments, the dielectric can have rough surfaces. However, in accordance with processes for manufacturing embodiments of RF MEMS switches described herein, the floating metal layer can be deposited directly on the dielectric, thereby substantially reducing or eliminating troublesome air gaps. While some air gaps may exist between the floating metal layer and the flexible membrane in the actuated position, ohmic contacts can be made between the floating metal layer and the flexible membrane. As such, any air gaps that might exist between the floating metal layer and the flexible membrane can have negligible effect on the capacitance seen by signals traveling through the RF MEMS switch and only affect contact resistance which has a much reduced impact on performance.

In several embodiments, the floating metal layers of the RF MEMS switches are patterned to provide sufficient electrical characteristics to enable biasing circuitry to apply an electric field that switches the flexible membrane to the actuated position and to enable the flexible membrane to return to the default position when the electric field is removed.

FIG. 1 is a top view of a RF MEMS switch 100 having a floating metal layer (not visible) for reducing an air-gap in the actuated position of the switch in accordance with one embodiment of the invention. The switch 100 includes a substrate 102, an electrode layer 104 positioned on the substrate 102, a dielectric layer 106 positioned on the electrode, a floating metal layer 110 (see FIG. 2) positioned on the dielectric 106, and a flexible membrane 108 positioned on posts 112 (see FIG. 2) above the dielectric 106.

Figure 2:
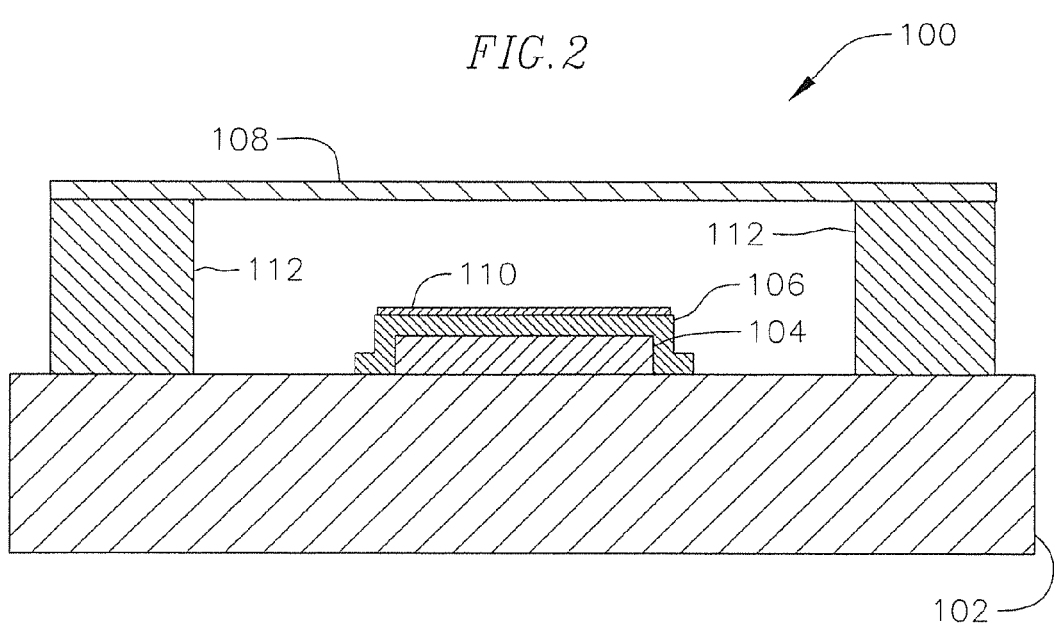
FIG. 2 is a cross sectional view of the RF MEMS switch of FIG. 1, including the floating metal layer, in a non-actuated state in accordance with one embodiment of the invention.

FIG. 2 is a cross sectional view of the RF MEMS switch of FIG. 1, including the floating metal layer 110, in a non-actuated state in accordance with one embodiment of the invention. As can be seen from FIG. 2, the electrode 104 is positioned on a portion of a top surface of the substrate 102. The dielectric 106 is positioned on top and side surfaces of the electrode 104 and portions of the substrate 102. The floating metal layer 110 is positioned on a top surface of the dielectric 106. While the top surface of the dielectric 106 may be uneven and rough, the floating metal layer 110 can be deposited on to the dielectric 106 in a deposition process as described below. In such case, the floating metal layer 110 can be positioned on top of the dielectric 106 with very little or no separation that would provide an air gap between the floating metal layer and dielectric.

While not shown, a bias control circuit is typically coupled to the membrane 108 and electrode 104. In operation, the bias control circuit can apply a DC bias voltage between the membrane 108 and electrode 104, thereby creating an electric field that actuates the membrane from the default position (e.g., FIG. 2) to an actuated position (e.g., FIGS. 3, 4). In the actuated position, the switch can provide maximum capacitive coupling (e.g., closed position for RF MEMS switch). When the DC bias voltage is removed, the flexible membrane can return to the default or non-actuated position that provides minimal capacitive coupling (e.g., open position for RF MEMS switch).

In the embodiment illustrated in FIG. 2, the substrate can be made of alumina. In other embodiments, other suitable materials can be used, including, without limitation, a high resistivity silicon such as gallium arsenide, alumina, quartz, glass or combinations thereof.

In the embodiment illustrated in FIG. 2, components appear to have certain relative sizes. However, FIG. 2 is not drawn to scale and other suitable component sizes can be used.

In the embodiment shown in FIG. 1, typical dimensions are 300 microns in length and 264 microns in width for the RF MEMS switch 102. In the embodiment shown in FIG. 2, the typical thickness of the metal post 112 is 3 microns and is typically made out of gold. The electrode 104 is typically 0.5 microns thick and made of gold and/or other metals while the dielectric 106 is typically 0.25 microns and made of silicon nitride. The floating metal layer 110 is typically 0.25 microns and can be made out of titanium while the flexible membrane 108 is typically 0.5 microns thick and made of aluminum. In this paragraph, reference has been made to specific dimensions and materials. In other embodiments, other suitable dimensions and materials can be used.

Figure 3:
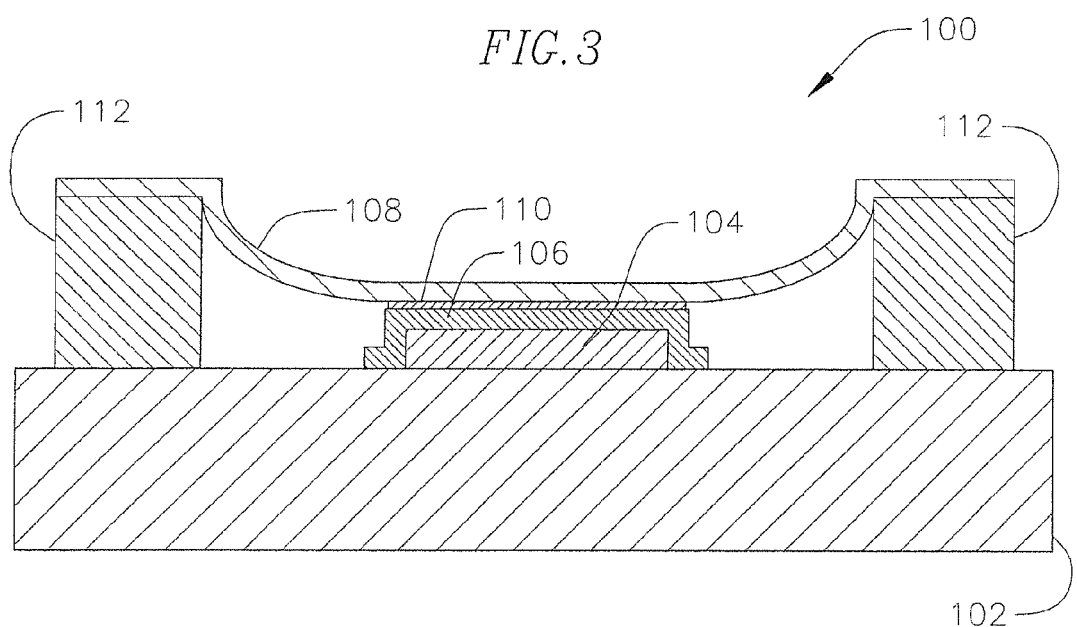
FIG. 3 is a cross sectional view of the RF MEMS switch and floating metal layer of FIG. 1 in an actuated state in accordance with one embodiment of the invention.

FIG. 3 is a cross sectional view of the RF MEMS switch 100 and floating metal layer 110 of FIG. 1 in an actuated state in accordance with one embodiment of the invention. In the actuated state or position, the membrane 108 of the switch 100 extends downward such that a center portion of the membrane 108 makes contact with the floating metal layer 110. In the actuated position, the floating metal layer 110 can contact the membrane 108 at multiple contact points effectively forming an ohmic, or metal to metal, contact between two metallic components. In some embodiments, both the membrane and floating metal layer have approximately flat surfaces such that the contact therebetween is made surface to surface (e.g., a total number of contact points is substantial).

The embodiments illustrated in FIGS. 2 and 3 can be modified to accommodate varying dimensions of the materials. For example, by changing the x-y-z dimensions of the electrode 104, the dielectric 106 and the floating metal layer 110, a larger or smaller capacitor can be formed without affecting the overall operation in accordance with the invention. In addition, the dimensions and thicknesses of the posts 112 and membrane 108 can be changed to increase or decrease the DC actuation voltage of the switch without affecting the overall operation in accordance with the invention. In several embodiments, the posts 112, membrane 108, electrode 104 and floating metal 110 are made out of conducting materials such as metals, but are not limited to a specific type of conductor. In a number of embodiments, the dielectric 106 is made of a non-conductive, low-loss RF dielectric material, but is not limited to any specific material.

Figure 4:
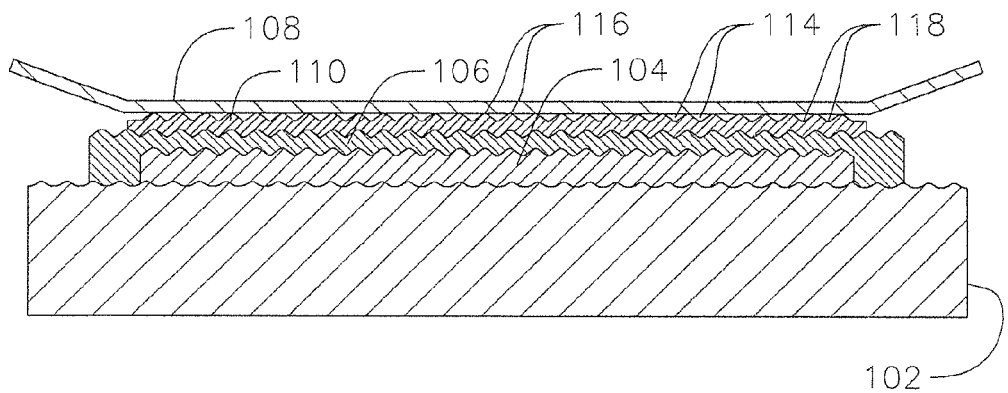
FIG. 4 is a cross sectional enlarged view of a section of the RF MEMS switch of FIG. 3 illustrating the floating metal layer in contact with a portion of the membrane in accordance with one embodiment of the invention.

FIG. 4 is a cross sectional enlarged view of a section of the RF MEMS switch 100 of FIG. 3 illustrating the floating metal layer 110 in contact with a portion of the membrane 108 in accordance with one embodiment of the invention. In the embodiment illustrated in FIG. 4, the top surface of the floating metal layer 110 is rough. As such, a number of contact points and air gaps exist between the top surface of the floating metal layer 110 and the membrane 108.

While not bound by any particular theory of operation, these air gaps between the floating metal layer and membrane do not affect the on-capacitance of the switch in the actuated position as the ohmic contact between those components makes them appear electrically as one continuous component. Instead, the on-capacitance is a function only of the dielectric constant of the dielectric layer and not air. As such, the on-capacitance can be controlled as desired by selection of a dielectric material and a particular thickness for a particular application.

Figure 5:
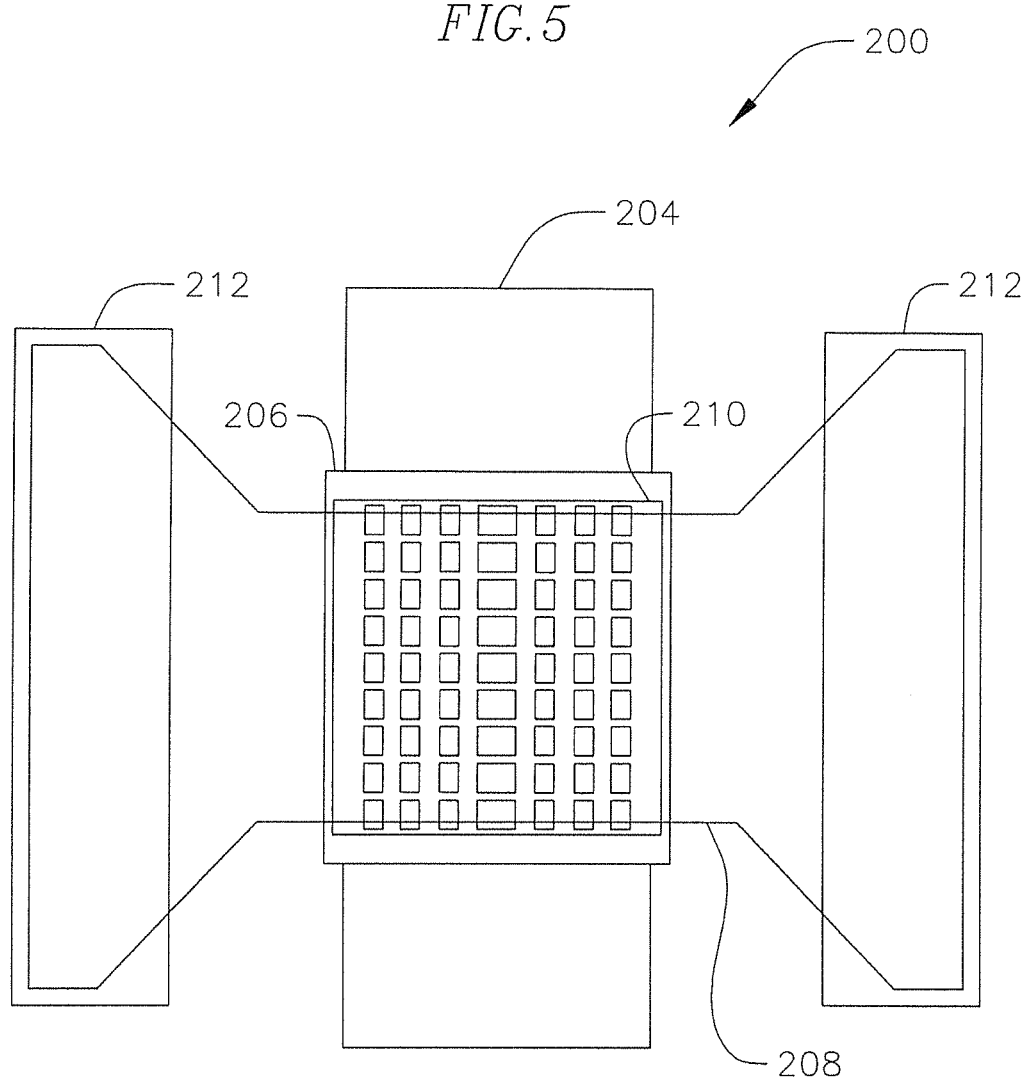
FIG. 5 is a top view of a RF MEMS switch having a patterned floating metal layer for switch biasing in accordance with one embodiment of the invention.

FIG. 5 is a top view of a RF MEMS switch 200 having a patterned floating metal layer 210 for switch biasing in accordance with one embodiment of the invention. The switch 200 includes a substrate (not shown), an electrode layer 204 positioned on the substrate, a dielectric layer 206 positioned on the electrode, the patterned floating metal layer 210 positioned on the dielectric 206, and a flexible membrane 208 positioned on posts 212 extending above the dielectric 206. The patterning of the floating metal layer 210 can allow the applied electric field to extend through the openings that extend through the floating metal layer to reach the membrane and actuate it even after the floating metal layer has taken a charge during a previous actuation.

While not bound by any particular theory, because the floating metal layer is not electrically connected to anything it has no way to quickly dissipate charge after the flexible membrane 208 has been released to its unactuated state. Therefore, any charge left behind from the previous actuation will continue to reside on the floating metal layer. In the case of a continuous (non-patterned) metal sheet, this left-over charge can effectively shield out any bias voltage applied to the switch and keep the membrane from acquiring enough charge to actuate or, at a minimum, can require a higher bias voltage for switch actuation than before the left-over charge was stored. In order to keep a constant actuation voltage over many actuations, the openings in the patterned floating metal layer can allow the electric field to pull the membrane down to actuate the switch regardless of the left-over charge on the floating metal layer.

In the embodiment shown in FIG. 5, the floating metal layer has been patterned in a particular manner. However, in other embodiments, the style, spacing and quantity of patterning can be varied in accordance with a number of desired design parameters, including, for example, the actuation voltage, the ohmic contact quality, the on-capacitance, and/or other design parameters.

FIG. 6 is an diagrammatic illustration of a process for manufacturing an RF MEMS switch 300, including cross sectional views of the switch at various stages and corresponding process steps, in accordance with one embodiment of the invention. In several embodiments, this process can be used to manufacture the RF MEMS switches of FIGS. 1 to 5. The process first deposits and patterns (350) an electrode 304 on a portion of a top surface of a substrate 302. The process further deposits and patterns (350) a dielectric 306 on top and side surfaces of the electrode 304 and portions of the substrate 302. The process then deposits and patterns (352) a floating metal sheet 310 on a top surface of the dielectric 306.

The process then deposits and patterns (354) two metal posts 312 on the top surface of the substrate 302 at locations spaced apart from the electrode 304, dielectric 306, and floating metal layer 310. In several embodiments, the locations of the metal posts 312 are spaced apart at distances from the electrode 304 that are about equal. The process then deposits (356) spacer material 314 between the metal posts 312 and on top of the floating metal layer 310 and portions of the dielectric 306. The process then deposits and patterns (358) a metal membrane 308 on top surfaces of the spacer 314 and metal posts 312. The process then etches or removes (360) the spacer material from the switch assembly 300.

In some embodiments, the process does not perform all of the actions described. In other embodiments, the process performs additional actions. In one embodiment, the process performs the actions in a different order than illustrated in FIG. 6. In some embodiments, the process performs some of the actions simultaneously.

In one embodiment, the process adds an additional thin dielectric to the top of the floating metal layer or floating electrode. In this case, the membrane in the actuated position would form a capacitor rather than an ohmic contact with the floating electrode. The RF signal would see this capacitance in series with the capacitance between the floating electrode and the bottom or substrate electrode. In such case, the capacitance would still be increased over that for a standard RF MEMS switch with no floating electrode if the top dielectric is significantly thinner than the first (bottom) dielectric. If $T_{bottom}$ represents the thickness of the bottom dielectric (e.g., between the bottom electrode and the floating electrode), $T_{top}$ represents the thickness of the dielectric on top of the floating electrode, and R represents the ratio of the membrane capacitance with and without the air gaps, then the ratio of capacitance with a floating electrode to that without a floating electrode will be $(T_{top}+T_{bottom})/(R \times T_{bottom}+T_{top})$, where $T_{top}+T_{bottom}$ equals the thickness of the MEMS dielectric without a floating electrode and R has a value such that $0 < R \le 1$.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A method for manufacturing a micro-electro-mechanical switch assembly comprising:
   depositing an electrode material on a surface of a substrate;
   depositing a dielectric material to form a dielectric layer on at least a portion of a surface of the electrode material;
   depositing a metal layer on at least a portion of a surface of the dielectric layer, the metal layer having a plurality of openings extending through the metal layer;
   depositing a plurality of posts on the substrate at positions spaced apart from the electrode material;
   depositing a spacer material on the metal layer and between the posts;
   depositing a flexible membrane on the spacer material and the posts; and
   etching the spacer material from the assembly.

2. The method of claim 1, wherein the depositing the electrode material on the surface of the substrate comprises depositing and patterning the electrode material on the surface of the substrate.

3. The method of claim 1, wherein the depositing the dielectric material on the at least the portion of the surface of the electrode material comprises depositing and patterning the dielectric material on the at least the portion of the surface of the electrode material.

4. The method of claim 1, wherein the depositing the metal layer on the at least the portion of the surface of the dielectric layer comprises depositing and patterning the metal layer on the at least the portion of the surface of the dielectric layer.

5. The method of claim 1, wherein the flexible membrane is configured to move from a default position to an actuated position in response to a preselected switching voltage applied between the flexible membrane and the electrode.

6. The method of claim 5, wherein, in the actuated position, the flexible membrane is in contact with the metal layer.

7. The method of claim 5, wherein the flexible membrane is configured to return to the default position in response to removal of the preselected switching voltage.

8. The method of claim 5, wherein, in the default position, the flexible membrane is not in contact with the metal layer.

9. The method of claim 5, wherein a capacitive coupling, of signals traveling along the electrode to signals traveling along the flexible membrane, in the actuated position is substantially greater than the capacitive coupling in the default position.

10. The method of claim 1, wherein the metal layer is not in contact with the electrode.

\* \* \* \* \*